United States Patent [19]

Burenga

[11] Patent Number: 4,859,136
[45] Date of Patent: Aug. 22, 1989

[54] REINFORCEMENT MEANS FOR TINES AND METHOD OF MANUFACTURE

[75] Inventor: Thomas I. Burenga, Litchfield, Ill.
[73] Assignee: Worksaver, Inc., Litchfield, Ill.
[21] Appl. No.: 740,392
[22] Filed: Jun. 3, 1985
[51] Int. Cl.$^4$ .............................................. B66F 9/12
[52] U.S. Cl. .................................... 414/607; 414/685; 414/724; 414/911
[58] Field of Search ............... 414/685, 722, 724, 727, 414/785, 908, 910, 911, 607

[56] References Cited

U.S. PATENT DOCUMENTS 3,908,844  9/1975  Duffield ............................. 414/724

FOREIGN PATENT DOCUMENTS 2069451  8/1981  United Kingdom ................ 414/911

Primary Examiner—Joseph E. Valenza
Attorney, Agent, or Firm—Paul M. Denk

[57] ABSTRACT

Reinforcing device formed from a bent metallic bar stock formed into two legs, having an intermediate bend thereof, inserted into the hollowed end of a tine, such as for a hay loader, or related lift mechanism, and therein reinforcing the tine against shear forces and bending moments. Apparatus is provided for bending the bar stock into the configuration of the reinforcing member, by applying a ram to the bar at that location where the bend is required, and forcing the bar to bend into the formation of a pair of legs, between a pair of guide rollers, through the longitudinal shifting of the ram under excessive force during bending of the bar into its reinforcing configuration.

2 Claims, 2 Drawing Sheets

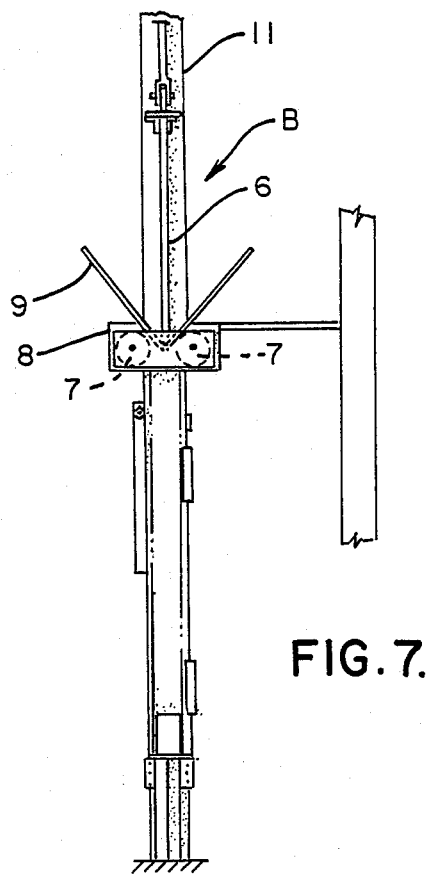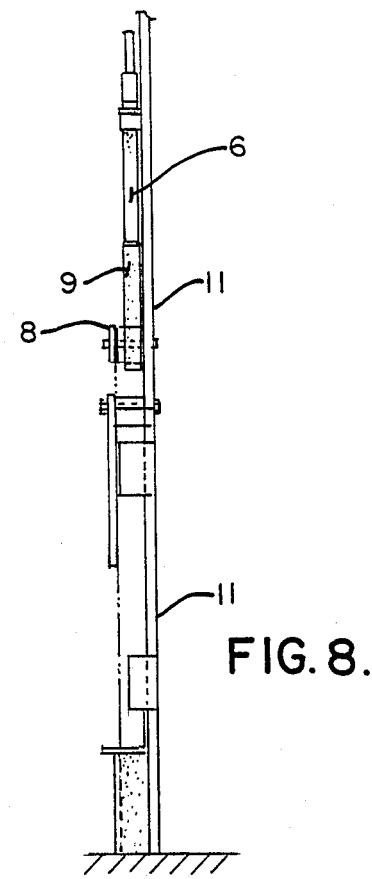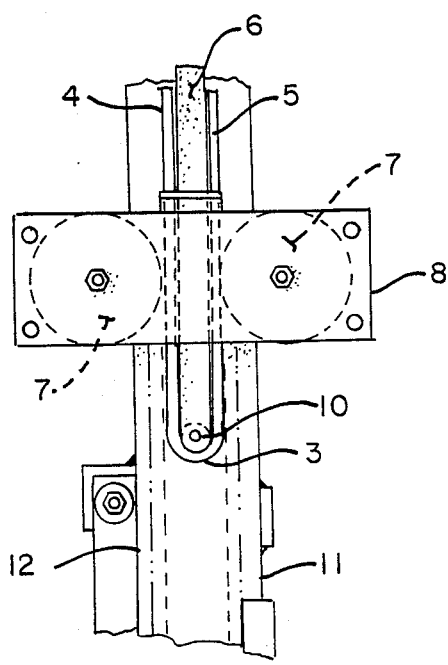
FIG. 7.    FIG. 8.
FIG. 9.

REINFORCEMENT MEANS FOR TINES AND METHOD OF MANUFACTURE

BACKGROUND OF THE INVENTION

This invention relates generally to the reinforcing of tines as used in conjunction with a hay loader, fork lift type truck, and related types of vehicles, and more specifically, pertains to the method of manufacture, the machinery for producing reinforcing means, all for application within tines to reinforce their structure particularly at the most vulnerable stress point in order to assure such an instrument of more useful and prolonged life.

The use of tines particularly upon an implement for picking up and conveying hay, or related materials, or even for application as a fork lift type truck for lifting heavy loads, has long been available in the art. Tines are those components that extend forwardly from the lift mechanism, and are the initial means that either slip under or pierce through the load to be lifted, such as a large bale of hay, and in addition, when the load is lifted, the tines withstand the entire weight of the heavy and bulk load laddened thereon. Thus, it becomes essential to reinforce such tines against bending moments, in order to assure their sustained application.

Heretofore, the reinforcement provided to tines, particularly at their base ends that connect into the lifting mechanism, was simply to weld to the external surfaces of the back half of the tines, a stock of metallic or other material that would provide for reinforcement at those locations. The problem with that type of reinforcement is that the reinforcement means on the welds would be exposed to view, are generally unsightly in appearance, present the weld connections to the elements where oxidation can rapidly take place, and in addition, the forward edges of the applied reinforcing means have a tendency to catch and snag onto the load being lifted. Hence, the current invention provides means and apparatus for eliminating these foregoing problems, and in addition, provides instrumentality for fabricating the novel style of reinforcing means of this invention, and its method of assembly and installation.

Hence, it is the principal object of this invention to provide reinforcing means that affords double reinforcement internally of the structured tines and applied at those locations where the tines sustain their greates bending moment, or where shear forces from the lifted and conveyed load are their greatest.

Another object of this invention is to provde reinforcing means that are totally concealed from view when applied within the internal opening of a lifting tine.

Another object of this invention is to provide a method for bending this reinforcing means for tines and their application in place.

A further object of this invention is to provide an apparatus for initially bending the reinforcing means into that configuration that allows for its immediate application and usage for reinforcing of tines, or other lifting mechanism.

These and other objects will become more apparent to those skilled in the art upon reviewing the summary of this invention, and upon undertaking a study of the description of its preferred embodiment, in view of the drawings.

SUMMARY OF THE INVENTION

This invention contemplates the formation of a reinforcing means that may be slidingly inserted within the end of equipment tines and to provide reinforcement at those locations where the forces of sheer and bending moments are at their greatest. For example, the reinforcing means of this invention utilizes a bar stock of preferably metallic material, and which is bent approximately at its mid-point, or elsewhere along its length, to form a pair of generally parallel legs, with the bend being integrally formed intermediate thereof, so that the bent bar of material can be slid into the open and hollowed interior at the end of a tine to reinforce the same therein, and to resist the forces of bending and shear that are encountered by the tines during application, particularly upon a hay lifting means, or the like. Preferably, the reinforcing means is formed of the bar stock of material, which will be generally rectangular in cross section, with the height of the stock of material being arranged vertically within any tine in which it inserts, in order to assure maximum resistance against bending moments at those locations where the reinforcing means conveniently and snugly inserts within its associated tine.

A further aspect of this invention is to provide the means for bending the bar stock into a reinforcing means for usage within a tine or other lifting mechanism, and in this particular instance, an apparatus incorporates a ram means that forces the bar stock into a spacing between a pair of guide rollers, under significant pressure, so that as the ram moves longitudinally down upon the bar stock, it bends it into a pair of legs, with the bend being located at that position where the ram initially contacts the bar during its exertion of the bending forces. The guide rollers have a tendency to force the legs of the bar stock forming the reinforcing means to a width that is desired for snug and resistance fitting of the formed reinforcing means within its associated tine, in which it is to be inserted, in order to assure a convenient and snug fit of the reinforcing means therein. In addition, it is likely that a tine could be arranged downwardly underneath and longitudinally aligned with the ram upon the apparatus for forming the reinforcing means into its usable configuration, so that as bending of the bar stock occurs, the ram could force under significant pressure the reinforcing means directly into the open hollowed end of the tine, or other lifting means, in order to provide for a one step process for bending bar stock material into a reinforcing means, and for inserting it directly into that component in which it is designed to provide enhanced strength as during tine usage.

BRIEF DESCRIPTION OF THE DRAWINGS

In referring to the drawings, FIG. 1 provides an isometric view of the tines of this invention, having this reinforcing means therein, and showing each tine being attached to a lifting apparatus, the latter of which is disclosed in phantom line;

FIG. 7 shows a front view of an apparatus useful for bending a reinforcing means of this invention during its formation;

FIG. 8 is a side view of the apparatus shown in FIG. 7; and

FIG. 9 is an enlarged partial front view of the apparatus shown in FIG. 7 disclosing the ram bending the reinforcing means into its usable configuration as arranged intermediate the pair of apparatus guide rollers.

DESCRIPTION OF THE PREFERRED EMBODIMENT

Figure 1:
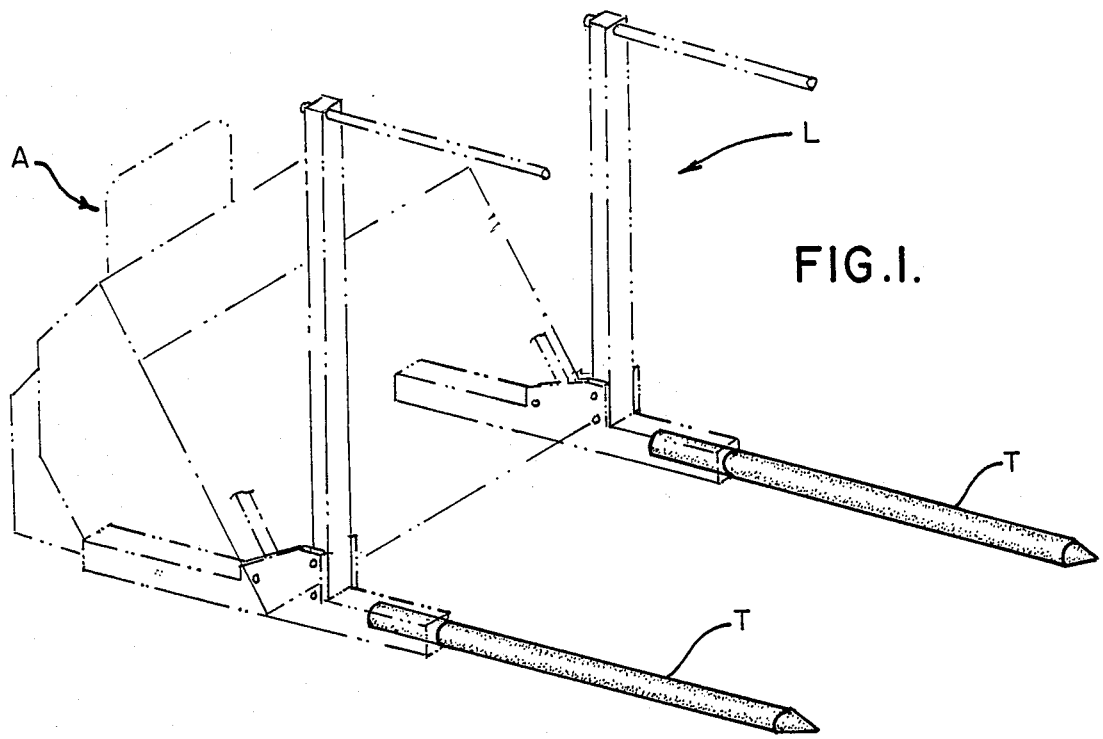
Figure 2:
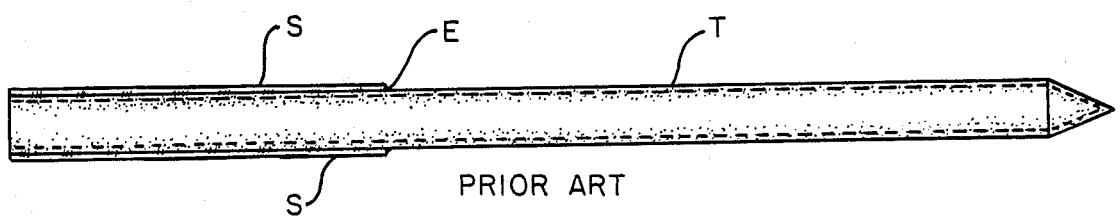
FIG. 2 discloses a top view of a tine having the prior art type of reinforcing means provided exteriorly to its sides.

In referring to the drawings, and in particular FIG. 1, one type of apparatus in which the reinforcing means of this invention is applied is disclosed. As can be seen, the apparatus A, shown in phantom line, discloses an implement for lifting of hay handling equipment, such as a loader L, and in this particular instance, the loader may be applied onto the front of a bucket for a bulldozer, high lift, blade, or any related type of instrument. But, the significance of this invention is to provide means for reinforcing of the tines T that are applied to the lifting apparatus, such as that device as used for handling hay, or related materials. As can be seen in FIG. 2, the means for reinforcing tines. Theretofore included the application, generally by way of welding, of plates or bar stock S onto the exterior surface of the tines, particularly at some segment of their back ends, in order to provide reinforcement against shearing forces, or bending moments to which the tines are exposed during lifting of a heavy load or bale of hay. But, as can be seen, the usage of prior art type of reinforcing means generally caused snagging, particularly at the front edges E of the reinforcing means, generally against the various twine or cord that holds the large round hay bales into their wrapped configuration. Snagging frequently would occur, cutting the twine, causing the bale of hay to fall from its shape and prevent it from being lifted by the hay loader of the type as disclosed herein.

Figure 3:
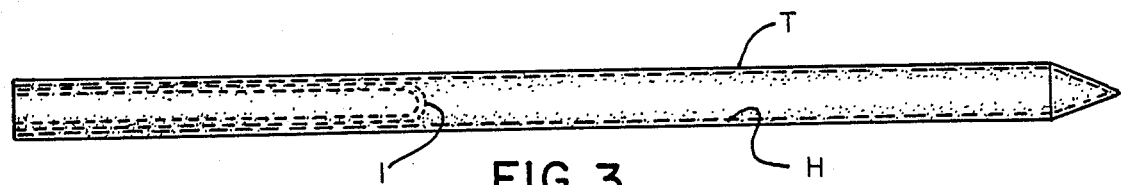
FIG. 3 discloses the tine of this invention having the reinforcing means being bent and located internally thereof in order to resist against the type of forces previously described.
Figure 4:
FIG. 4 is a back end view of the tine of FIG. 3 having the reinforcing means arranged therein.
Figure 6:
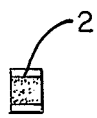
FIG. 6 is a back end view of the reinforcing means disclosed in FIG. 5.
Figure 5:
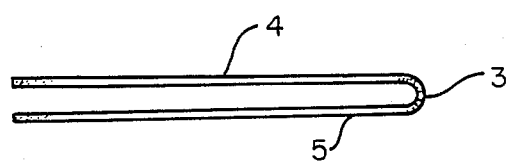
FIG. 5 is a top view of a reinforcing means bent into its dual legged configuration and ready for application within a tine to reinforce the same against bending forces.

The current invention does improve upon what has previously been done, and as can be seen in FIG. 3, the tine T includes a hollow interior, as at H, and into this hollow interior is frictionally and snugly pressed the reinforcing means 1 of this invention. This reinforcing means, as can be seen in FIGS. 5 and 6, includes a bar stock of rectangular material, as seen at 2, as in FIG. 6, with the reinforcing means being bent at a bending segment 3, and formed into a pair of legs 4 and 5 so as to provide for its snug fit within the end of the hollowed interior H of the standard tine. Preferably, the height segment of the reinforcing means will fit vertically arranged within the tine, and therein provide the greatest resistance against the shear forces or the bending moment to which the tines are subjected during the lifting of a heavy bale of hay, or other load. This new method for reinforcing the tines presents only smooth edges of the tubing forming the tine, so that the problems heretofore with respect to the prior art form of reinforcing means has been obviated. In addition, by bending the reinforcing means into a pair of legs, as shown in FIG. 5, a double reinforcement is actually provided for the tine at its back end or segment, with the reinforcement extending approximately one-fourth to one-half of the length of the tine, preferably disposed up to approximately the one-third distance of the overall tine length. Hence, with this new style of reinforcing means, double cross-sectional areas of the reinforcing means must be sheared before a tine will fracture, meaning that double strength can be applied in the application of the tine, and its hay loading device, during its application. In addition, since the reinforcing means of this invention extends interiorly of the tine, and simply rests in place by means of frictional engagement therein, no more welding will be required for holding a reinforcing means in place, such as was done in the prior art, as disclosed in FIG. 2. Through prior measurements, it is has been determined that approximately sixty inches of welding was required in the prior art to adhere the older style of reinforcing externally applied bars of material in place. Furthermore, with the old style of reinforcing means, after the weld applied the bar stock to the exterior surfaces of the tines, grinding had to be undertaken in order to eliminate the sharp corners of the bar stock, to minimize or eliminate any sharp edges that were normally exposed and would readily cut or snag any of the twine on the baled hay.

As can also be seen in FIG. 5, in the formation of the double reinforcing means of this invention, as disclosed therein, the legs for the reinforcing means may be shown substantially parallel in disposition, but it is likely that the bar stock may be bent so that the legs flare slightly outwardly with respect to each other, and therefore when it is compressed into the hollowed interior of the tine, the flaring legs will significantly compress against the interior of the tine, thereby assuring that the reinforcing means is very snugly adhered in place, and will not slip out of the same, or allow the tine to become disengaged from its hay loader.

Furthermore, as can be seen in FIGS. 7 through 9, an apparatus is provided for quickly forming the reinforcing means of this invention. As can be seen in FIG. 7, the bending apparatus B incorporates a ram means 6 which is disposed for vertical and longitudinal movement intermediate a pair of guide rollers 7, with a support means 8 containing the guide rollers, and in addition, provides that initial support for the bar stock 9 in its flattened condition, but which when encountered by the lower end 10 of the ram 6, as it moves downwardly under significant force, bends the bar stock intermediate the guide rollers 7, for forming it into a pair of substantially or slightly flared legs 4 and 5, for forming the applicable reinforcing means of this invention. As can be seen in FIG. 9, the bend 3 is formed about the lower end 10 of the bar stock, during the reinforcing means fabrication. A structured base 11 provides the instrument for holding the various operating components of this invention, such as the support means, in addition to the guide rollers 7, while the ram means 6 will be urged downwardly, through some form of mechanical pressure, such as generated from electric motor, hydraulic press, or other means for forcing the bar stock downwardly into its bending configuration between the guide rollers 7, as can be seen. And, as previously explained, the guide rollers may be set sufficiently far enough apart, so as to allow for a slight flaring between the legs 4 and 5 of the reinforcing means, as it is formed, in order to provide for that convenient and snug fit if not a binding hold of the reinforcing means within the open hollowed end of any tine in which it is located. And, as previously summarized, it is likely that the base means 11 of the rod forming apparatus could contain a locator for positioning of a tine T in place, below the support means 8, so that as the bar stock 9 is forced by the ram means 6 into its bent configuration, it could be slidingly inserted directly downwardly into a tine, such as shown in hidden line, as at 12, as disclosed in FIG. 9.

Variations or modifications to the subject matter of this invention may occur to those skilled in the art upon reviewing the description of the preferred embodiment herein. Such variations, if within the spirit of this invention, are intended to be encompassed within the scope of any claims to patent protection issuing upon this development. The description of the preferred embodiment set forth herein is done so for illustrative purposes only.

Having thus described the invention, what is claimed and desired to be secured by Letters Patent is:

1. Reinforcing means for agricultural or other equipment tines of the type used for loading materials or the like, said tines being of the type attaching with structural means that provides for maneuverability of the tines during application, each tine comprising a hollow rod like member being opened at least at one end for attachment with the structured means of the equipment, and incorporating means at its other end to facilitate its usage in transferring a load of material, said reinforcing means comprising a metallic bar being bent back upon itself to form a pair of approximately adjacent legs, said metallic bar being of rectangular cross section, the bent portion and legs of the reinforcing means inserting within the hollow rod like member at its structured means attaching end to structurally reinforce said tine during usage for conveying of a heavy load, and the height of the bent bar being vertically disposed within the reinforced tine.

2. The invention of claim 1 and wherein said reinforcing means inserting within each tine extending approximately a one - fourth to one - half of the length of said tine.

* * * * *